(12) United States Patent
Markham

(10) Patent No.: US 7,762,588 B2
(45) Date of Patent: Jul. 27, 2010

(54) FLUID STORAGE TANK TRAILER

(76) Inventor: Gary R Markham, 273 Country Lane Dr., Lumberton, TX (US) 77657

( * ) Notice: Subject to any disclaimer, the term of this patent is extended or adjusted under 35 U.S.C. 154(b) by 200 days.

(21) Appl. No.: 12/175,162

(22) Filed: Jul. 17, 2008

(65) Prior Publication Data

US 2010/0013207 A1 Jan. 21, 2010

(51) Int. Cl.
*B60P 3/22* (2006.01)
(52) U.S. Cl. ..................... 280/839
(58) Field of Classification Search ........... 280/830, 280/837, 839; 182/84, 124; 105/30, 27, 105/28, 425, 426, 427
See application file for complete search history.

(56) References Cited

U.S. PATENT DOCUMENTS

| | | | | |
|---|---|---|---|---|
| 235,311 A | * | 12/1880 | Stephenson | 105/425 |
| 289,726 A | * | 12/1883 | Tevis | 160/139 |
| 1,713,730 A | * | 5/1929 | Wright | 105/425 |
| 6,152,492 A | * | 11/2000 | Markham et al. | 280/837 |
| 6,375,222 B1 | * | 4/2002 | Wade | 280/837 |
| 6,390,325 B1 | * | 5/2002 | Gonzales | 220/567.2 |
| 7,300,073 B2 | * | 11/2007 | Bachman | 280/839 |
| 2009/0273174 A1 | * | 11/2009 | Markham | 280/837 |

* cited by examiner

*Primary Examiner*—Tony H. Winner

(57) ABSTRACT

Embodiments provide a fluid storage tank trailer including a base including a set of rear wheels, a tank supported by the base, the base including a set of skids adapted to engage the ground forward of the rear wheels when the trailer is not connected to a tow vehicle, the skids being adapted to support the tank bottom in relation to the ground, a forward frame adapted to be towed by a tow vehicle, a forward platform elevated above the forward frame, the forward platform having a first end adjacent a first front corner, the forward platform having a second end adjacent a second front corner, the forward platform defining a walkway between the first end and the second end.

14 Claims, 10 Drawing Sheets

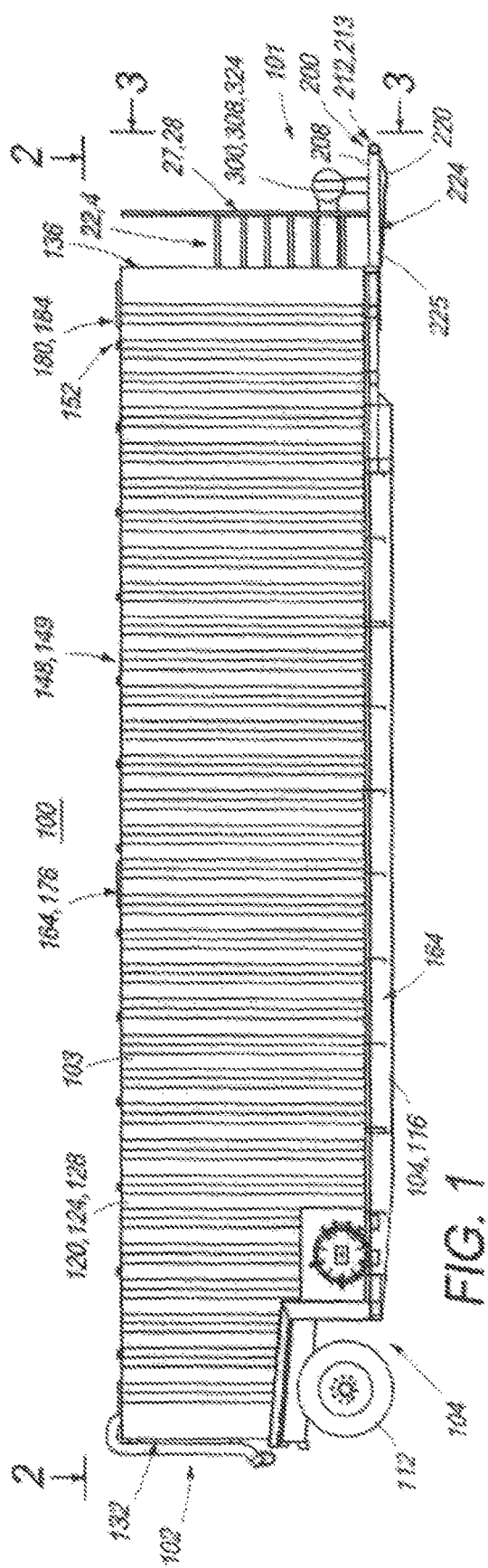
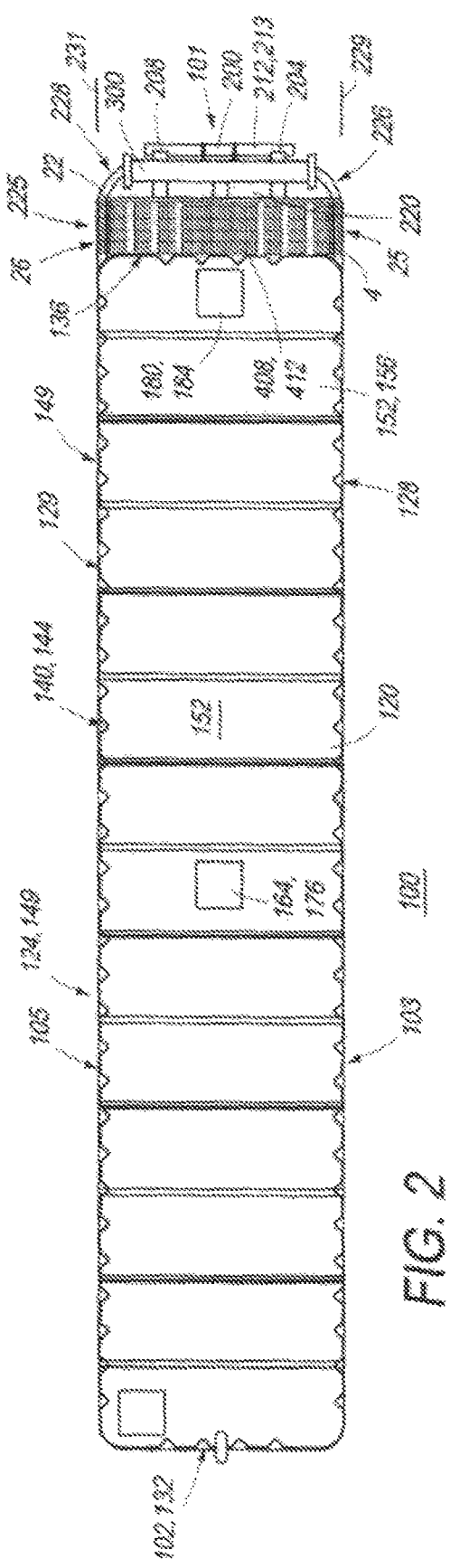

FLUID STORAGE TANK TRAILER

FIELD OF INVENTION

The present application is related to the certain application filed on even date herewith and titled "Fluid Storage Tank Trailer", which is incorporated herein by reference. The disclosure relates to fluid storage tank trailers.

BACKGROUND OF INVENTION

Fluid storage tank trailers are used to provide storage for industrial fluids at temporary locations such as, for example, drilling sites for oil and gas wells. An empty fluid storage tank trailer is towed to a temporary location, such as a drilling site, by a tow vehicle such as a semi-tractor. At a drilling site, the fluid storage tank trailer is unhooked from the tow vehicle to rest in a fixed position on the ground or another suitable support surface, such as a layer of rock aggregate.

When resting in a fixed position on the ground, a fluid storage tank trailer is filled with fluid to be stored and dispensed. Examples of industrial fluids stored in fluid storage tank trailers include drilling mud, fracturing liquids, fluids from environmental cleanup, water, brine, and any other suitable fluid material. As used herein, the term "fluid" is intended to generally include any material which can flow into and out of a fluid storage tank trailer if maintained in a desired condition, and thus "fluid" is intended to include any flowing mixture, suspension, slurry, or combination of materials in different phases. One specific example of a use for a fluid storage tank trailer is storage of drilling mud at a drilling site for an oil and gas well.

Depending on project size, the number of fluid storage tank trailers in use at a drilling site can vary from about two to fifty or more. When numerous fluid storage tank trailers are present at a site, it can be convenient to position them adjacent each other, side by side, in rows. In each row, heading the side by side fluid storage tank trailers in one direction can simplify connecting fluid supply hoses to manifolds on the fluid storage tank trailers.

It will be understood by those skilled in the art that fluid storage tank trailers can be used in a variety of circumstances and locations, and for purposes different from those specifically described herein. For the reasons stated above, and for other reasons stated below which will become apparent to those skilled in the art upon reading and understanding the present specification, there is a need in the art for improved fluid storage tank trailers.

BRIEF DESCRIPTION OF INVENTION

The disclosure provides improved fluid storage tank trailers. Various shortcomings, disadvantages and problems of fluid storage tank trailers are addressed herein, which will be understood by reading and studying the following specification.

BRIEF DESCRIPTION OF DRAWINGS

FIG. 1 is a side elevation of a fluid storage tank trailer according to an embodiment.

FIG. 2 is a top plan view of the fluid storage tank trailer and taken generally along 2-2 in FIG. 1.

DETAILED DESCRIPTION OF EMBODIMENTS

Figure 3:
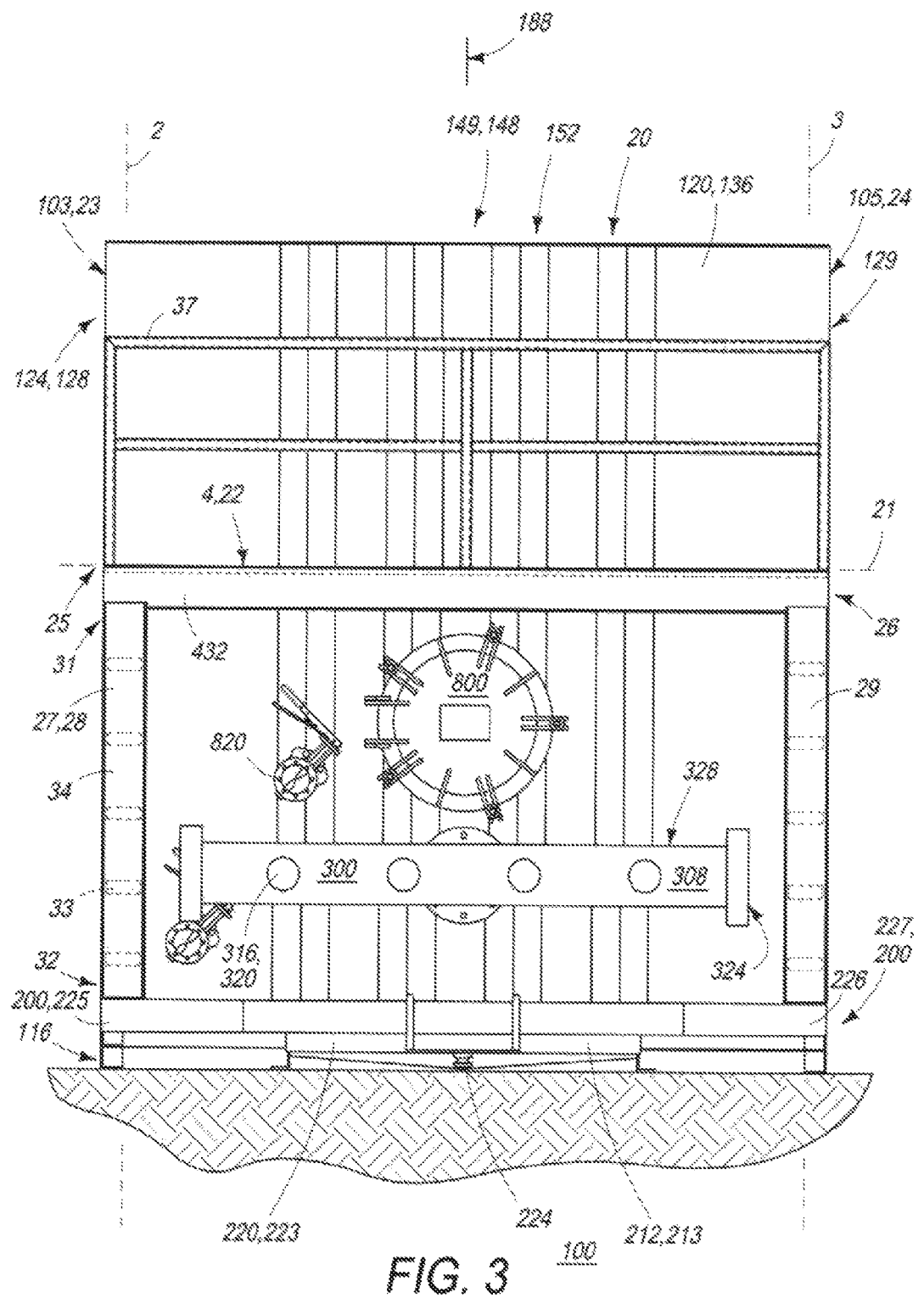
FIG. 3 is an enlarged end view of the fluid storage tank trailer taken generally along 3-3 in FIG. 1, clarified by omission of minor details including certain tank wall corrugations and manifold braces.

In the following detailed description, reference is made to the accompanying drawings that form a part hereof, and in which is shown by way of illustration specific embodiments which can be practiced. The embodiments are described in sufficient detail to enable those skilled in the art to practice the embodiments. It is to be understood that other embodiments can be utilized and that logical, mechanical and other changes can be made without departing from the scope of the embodiments. The following detailed description is, therefore, not to be taken in a limiting sense.

FIG. 1 is an elevated front perspective view of a fluid storage tank trailer 100 (hereinafter "trailer 100") according to an embodiment. One skilled in the art will appreciate that trailer 100 can be configured differently without departing from the scope of the present disclosure and embodiments. Trailer 100 is adapted to store and dispense fluid (not shown). As previously described herein, the term "fluid" is intended to generally include any material which can flow into and out of a fluid storage tank trailer if maintained in a desired condition, and thus "fluid" is intended to include any flowing mixture, suspension, slurry, or combination of materials in different phases. In the specific embodiment illustrated in FIG. 1, trailer 100 can be used to store and dispense fluids including, for example, drilling mud. Trailer 100 is generally described as having a rear end 102, a front end 101 opposite the rear end 102 in a forward direction, an elongated first side 103 extending between the front end 101 and rear end 102, and a second side 105 (shown in FIG. 2) opposite the first side 103 in parallel relation thereto.

Trailer 100 includes base 104 (FIG. 1). Base 104 is adapted to engage the ground. Base 104 includes a set of rear wheels 112 mounted on a rear axle (not shown) to engage the ground for rolling movement relative thereto. Rear wheels 112 support trailer 100 for towing by a suitable tow vehicle, such as a truck (not shown). Base 104 includes a set of skids 116. Skids 116 are spaced from rear wheels 112 and extend in a longitudinal direction. Skids 116 are adapted to engage the ground when trailer 100 is not connected to a tow vehicle.

Trailer 100 includes tank 120 (FIG. 1 and FIG. 2). Tank 120 includes a set of generally vertical sides 124. Cooperation of sides 124 defines an interior space (not shown) suitable for storage of fluid. Sides 124 include an elongated first major side wall 128 extending in the longitudinal direction. Sides 124 include an elongated second major side wall 129. Second major side wall 129 is spaced from first major side wall 128 in parallel, opposed relation therewith. Sides 124 include a rear wall 132 extending in a transverse direction between first major side wall 128 and second major side wall 129 and in perpendicular relationship thereto. Sides 124 include a front wall 136 spaced from rear wall 132 and in parallel, opposed relation thereto. Sides 124 are formed of suitable plate material 140. Those skilled in the art will appreciate that plate material 140 can be formed of any suitable material. In the embodiment illustrated in FIG. 1, plate material 140 is suitable steel plate material 144. As will be appreciated by those skilled in the art, in the specific embodiment illustrated in FIG. 1, plate material 140 is corrugated material having a nominal thickness of 0.25 inches. Side walls 128 are joined in a suitable manner, such as by weld seams (not shown). Cooperation of side walls 128 defines a generally continuous upper edge 148. Upper edge 148 extends generally in a horizontal direction around a perimeter 149 of tank 120. As shown in FIG. 2, tank 120 includes a generally horizontal roof 152. Roof 152 is joined to side walls 128 in a suitable manner. In the embodiment illustrated in FIG. 1, roof 152 is joined to side walls 128 at upper edge 148 by suitable weld seams (not shown). Roof 152 is formed of suitable plate material 156. Those skilled in the art will appreciate that plate material 156 can be formed of any suitable material. In the embodiment illustrated in FIG. 1, plate material 156 is suitable steel plate material. As will be appreciated by those skilled in the art, in the specific embodiment illustrated in FIG. 1, plate material 160 is flat steel plate having a nominal thickness of 0.25 inches. It will be appreciated that tank 120 includes a plurality of roof braces (not shown) supporting plate material 156 in a suitable manner. Tank 120 includes a tank bottom 164 (FIG. 1) spaced from roof 152 and generally in parallel relation therewith. Tank bottom 164 is joined in a suitable manner to side walls 128 and thus defines a bottom of the interior space (not shown). Skids 116 of base 104 are joined to tank bottom 164 to support tank 120 relative to the ground.

Roof 152 has therein a plurality of access portals 164 (FIG. 2). Each access portal 164 defines an opening in communication with interior space of tank 12. Roof 152 includes a plurality of movable access lids 176. Each access lid 176 is selectively movable relative to a respective access portal 164 between a closed position and an open position. Although access lids 176 can be supported for movement relative to access portals 164 in any suitable manner, in the specific embodiment illustrated and described herein, a horizontal hinge (not shown) enables each access lid 176 to be pivoted between the closed position and the open position. Each access lid 176 in the closed position prevents access to the interior space of tank 12 through the respective access portal 164. Each access lid 176 in the open position permits access to the interior space of tank 12 through the respective access portal 164. In the specific embodiment illustrated in FIG. 1, a front one 180 of the access portals 164 and a respective front one 184 of the access lids 176 are located in roof 152 adjacent upper edge 148 at vertical centerline 188 of front wall 136. It will be appreciated by those skilled in the art that fluid present in the interior space of tank 12 is visible along a line of sight extending through an access portal 164 when the respective access door 176 is in the open position. It will be appreciated by those skilled in the art that, according to embodiments (not shown) the front one 180 of the access portals 164 and the respective front one 184 of the access lids 176 located in roof 152 adjacent upper edge 148 of front wall 136 is not located at the centerline 188. More particularly, according to embodiments (not shown), the front one 180 of the access portals 164 and access lids 176 is spaced from vertical centerline 188 and one of the first major side wall 128 and the second major side wall 129. It will be appreciated by those skilled in the art that fluid present in the interior space of tank 12 is visible by an operator positioned to view along a line of sight extending through an access portal 164 from above the height of upper edge 148 of side walls 128 when the respective access door 176 is in the open position.

Referring to FIG. 2, trailer 100 includes forward frame 200. Forward frame 200 extends in the forward direction from tank 120 at front wall 136. Forward frame 200 includes a plurality of forward frame members 204. It will be appreciated by those skilled in the art that forward frame members 204 can be arranged in any suitable configuration. One skilled in the art will appreciate that the forward frame members 204 can be formed of any suitable rigid material having any suitable dimensions and cross-sectional profile. One skilled in the art will appreciate that cooperation of forward frame members 204 defines a tow bar assembly 205. In the specific embodiment illustrated in FIG. 1, forward frame members 204 include a spaced pair of major forward frame members 208. Each of the major forward frame members 208 is an elongated structural member. The pair of major forward frame members 208 extends in the longitudinal direction. More particularly, the major forward frame members 208 extend generally in the longitudinal direction from tank 120 at tank bottom 164 and base 104 at skids 116. The pair of major forward frame members 208 extends in spaced, parallel relation about 54 inches forward of front wall 136. In the specific embodiment illustrated in FIG. 1, each of the major forward frame members 208 is a tubular member of rectangular cross section formed of carbon steel, having a nominal size of 4 inches by 6 inches and ⅜ inches nominal wall thickness. Forward frame members 204 include terminal forward frame member 212. The pair of major forward frame members 208 intersects terminal forward frame member 212. One skilled in the art will appreciate that, in the specific embodiment illustrated in FIG. 1, forward frame member 212 defines a heavy duty nose bar 213 extending in the transverse direction. Terminal forward frame member 212 is joined to the pair of major forward frame members 208 in a suitable manner, such as by weld seams. Terminal forward frame member 212 extends in the transverse direction perpendicular to the parallel pair of major forward frame members 208. Terminal forward frame member 212 thus extends generally in spaced, parallel relation to front wall 136. In the specific embodiment illustrated in FIG. 1, terminal forward frame member 212 is a tubular member formed of carbon steel, having a nominal diameter of about 4.5 inches. The forward frame members 204 include a plurality of minor forward frame members (not shown) each traversing between the pair of major forward frame members 208. Each of the minor forward frame members extends in the transverse or perpendicular direction between the pair of major forward frame members 208 in spaced parallel relation to terminal forward frame member 212. Each of the minor forward frame members is an elongated rigid structural member having opposite ends each joined to and terminating at one of the major forward frame members 208 in a suitable manner. In the specific embodiment illustrated, the opposite ends of minor forward frame members are joined to the major forward frame members 208 by weld seams. Forward frame members 204 include a forward pan member 220. Forward pan member 220 is formed of continuous plate material 223. Forward pan member 220 extends between terminal forward frame member 208 and a minor forward frame member. Forward pan member 220 is joined to terminal forward frame member 212 and the minor forward frame member in a suitable manner, such as by weld seams. A king pin 224 is mounted on forward frame 204 in a suitable manner and location. King pin 224 is adapted to be received by a tow vehicle for towing trailer 100. The forward frame members 204 include a spaced pair of generally opposed first and second forward outer frame members 225, 226. The first and second forward outer frame member 225, 226 are elongated members extending generally in the longitudinal direction and generally parallel to respective of the major forward frame members 208. A major portion 227 of each of the first and second forward outer frame members 225,226 is spaced in the transverse direction and outward from a respective one of the major forward frame members 208. The major portion 227 of each of the first and second forward outer frame members 225,226 extends in the longitudinal direction along a respective first major outer frame axis 229 or second major outer frame axis 231 (FIG. 2). It will be understood that the first major outer frame axis 229 and second major outer frame axis 231 are each aligned generally beneath a respective one of the first major side wall 128 and second major side wall 129, and generally in a common vertical plane therewith. A minor portion 228 of each of the first and second forward outer frame members 225,226 curves inwardly in the transverse direction from major portion 227 and intersects a respective one of the major forward frame members 208.

Trailer 100 includes manifold assembly 300. Manifold assembly 300 is supported by forward frame 200. Manifold assembly 300 includes manifold pipe 304 entering tank 120 at a flange 305. The flange defines a passage through front wall 136. Manifold assembly 300 includes manifold header 308. Manifold header 308 is joined to manifold pipe 304 by a suitable fitting (not shown). In the specific embodiment illustrated in FIG. 1, fitting 312 is a tee fitting. Manifold header 308 includes a set of ports 316. In the specific embodiment illustrated in FIG. 1, manifold header 308 includes four front hose ports 320 and two end ports 324. More particularly, in the specific embodiment illustrated in FIG. 1, manifold header 308 includes an elongated tubular body 328 having spaced ends 332. Tubular body 328 has therein the four front hose ports 320 spaced therealong. Each hose port 320 is adapted to be connected to a respective fluid hose (not shown). Tubular body 328 includes a pair of ends each having therein a respective one of the end ports 324. Each end port 324 is adapted to be connected to a respective fluid hose (not shown). Forward frame 200 includes a plurality of manifold supports 340 (FIG. 1) supporting manifold assembly 300 in a fixed position. In the specific embodiment illustrated in FIG. 1, manifold assembly 300 extends about 36 inches from front wall 136 and is supported at a height of about 18 inches above the forward frame members 204. It will be understood by those skilled in the art that hoses (not shown) can be routed across the ground from a drill rig and connected to each front hose port 320 and end port 324 during use of tank 120 for storing and dispensing fluid.

Referring to FIG. 3, trailer 100 includes forward manhole 800. Forward manhole 800 is located in front wall 136 immediately below forward platform 4. Forward manhole 800 permits access to tank 120 by maintenance personnel. Valves 820 are located on front wall 136.

FIG. 3 is an enlarged front elevation view of fluid storage tank trailer 100. Fluid storage tank trailer 100 includes forward platform 4. Forward platform 4 is supported in a fixed position adjacent front wall 136 of tank 120 and generally above forward frame 200, manifold assembly 300 and forward manhole 800. Forward platform 4 is located relative to upper edge 148 at a height or elevated position 21 suitable for an operator standing on forward platform 4 to view roof 152 from an elevated line of sight. In the specific embodiment illustrated, forward platform 4 is located relative to upper edge 148 at elevated horizontal axis or elevated position 21 at a height suitable for an operator standing on forward platform 4 to manually reach and move at least the front one 184 of the access lids 176 (FIG. 2) relative to the front one 180 (FIG. 2) of the access portals 164 adjacent front wall 136 on roof 152 to enable the operator when standing on forward platform 4 to view along an elevated line of sight into the interior space of tank 120 through front one 180. It will be understood that forward platform 4 can be constructed and supported in any suitable manner. It will also be understood that forward platform 4 can be of any desired shape and size. In the specific embodiment illustrated in FIG. 3, forward platform 4 defines a generally rectangular walkway 22 at elevated position 21. It will be understood that elevated position 21 is intended to include and describe all vertical locations above forward frame 200, and is not to be limited solely to the specific elevated position shown in the specific embodiment illustrated in FIG. 3. In the specific embodiment illustrated in FIG. 3, walkway 22 extends in the transverse direction along front wall 136 of tank 120 between first side 103 and second side 105. Particularly, both forward platform 4 and walkway 22 defined thereby extend between first side 103 and second side 105 at elevated position 21. It will be appreciated that walkway 22, defined by forward platform 4, terminates both at first side 103 and at second side 105. More particularly, in the specific embodiment illustrated in FIG. 3, walkway 22 extends in the transverse direction adjacent front wall 136 at elevated position 21 between respective first and second front corners 23,24 of tank 120. It will be appreciated that first front corner 23 and second front corner 24 of tank 120 are defined by respective intersections of opposite ends of front wall 136 and respective of first major side wall 128 and second major side wall 129 (FIG. 3). It will be appreciated that walkway 22 includes spaced first and second ends 25,26. First and second ends 25,26 terminate at respective of the first and second front corners 23,24. It will be appreciated that first end 25 is located adjacent tank 120 at first side 103 and at elevated position 21. It will be appreciated that second end 26 is located adjacent tank 120 at second side 105 and at elevated position 21. Walkway 22 thus is positioned and dimensioned to enable the operator to walk along and adjacent front wall 136 of tank 120 at elevated position 21 at all points between first side 103 and second side 105. It will be understood that the operator thus can stand, view and access tank 120 from walkway 22 at elevated position 21 from any location in the lateral direction between first end 25 at first side 103 and second end 26 at second side 105.

Referring to FIG. 3, forward platform 4 is located relative to upper edge 148 at a height suitable for an operator standing on forward platform 4 to view roof 152 from an elevated line of sight. In the specific embodiment illustrated, forward platform 4 is located relative to upper edge 148 at a height suitable for an operator standing on forward platform 4 to manually reach and move at least the front one 184 of the access lids 176 relative to the front one 180 of the access portals 164 adjacent front wall 136 on roof 152 to enable the operator when standing on forward platform 4 to view along an elevated line of sight liquid into the interior space of tank 120 through front one 180. It will be understood that forward platform 4 can be constructed and supported in any suitable manner. It will also be understood that forward platform 4 can be of any desired shape and size. In the specific embodiment illustrated in FIG. 3, forward platform 4 defines a generally rectangular platform floor 404. It will be appreciated by those skilled in the art that platform floor 404 can be formed of any suitable material. In the specific embodiment illustrated, platform floor 404 is formed of suitable tread plate or floor grate 408. Floor grate 408 can be formed of any suitable material. In the embodiment illustrated in FIG. 5, floor grate 408 is formed of suitable metal which is galvanized steel. In the specific embodiment illustrated in FIG. 5, floor grate 408 is formed of open lattice perforated galvanized steel having skid resistant upper surface serrations (not shown). In the specific embodiment illustrated in FIG. 5, forward platform 4 includes a plurality of platform frame members 416 adapted to support platform floor 404 in an elevated position. It will be understood that platform frame members 416 can be configured in any suitable manner. In embodiments (not shown), forward platform 4 does not include platform frame members 416. In the specific embodiment illustrated in FIG. 5, platform frame members 416 include a spaced pair of inner and outer platform frame members 428,432. Inner platform frame member 428 and outer platform frame member 432 extend in spaced parallel relation and support respective inner and outer edge portions of floor grate 408. In the specific embodiment illustrated in FIG. 5, the inner platform frame member 428 and outer platform frame member 429 are formed of respective beams 452. One will appreciate that beams 452 can be formed of any suitable material having any suitable structural strength. In the specific embodiment illustrated, each beam 452 is formed of carbon steel beam having an L-shaped profile. In the specific embodiment illustrated in FIG. 5, spaced beams 452 are joined by a set of spaced lateral cross members 453. One of skill in the art will appreciate that beams 452 and lateral crossmembers 453 can be arranged in any of various suitable configurations to support platform floor 404. One skilled in the art will understand that platform frame members 416 can be arranged and joined in any suitable manner such as, for example, by weld seams (not shown) or by a plurality of threaded bolt and nut fasteners (not shown). One skilled in the art will appreciate that, in the specific embodiment illustrated in FIG. 5, inner platform frame member 420 and outer platform frame member 424 are supported at opposite first and second ends 25,26 by respective of first ladder 28 and second ladder 29. One skilled in the art will appreciate that in other embodiments (not shown), inner platform frame member 420 is supported by tank wall 136. It will be appreciated that, in the specific embodiment illustrated, forward platform 4 has a width of about twenty four inches, measured between inner platform frame member 420 and outer platform frame member 424. It will be further understood that first ladder 28 and second ladder 29 each have a width of about twenty four inches.

Figure 4:
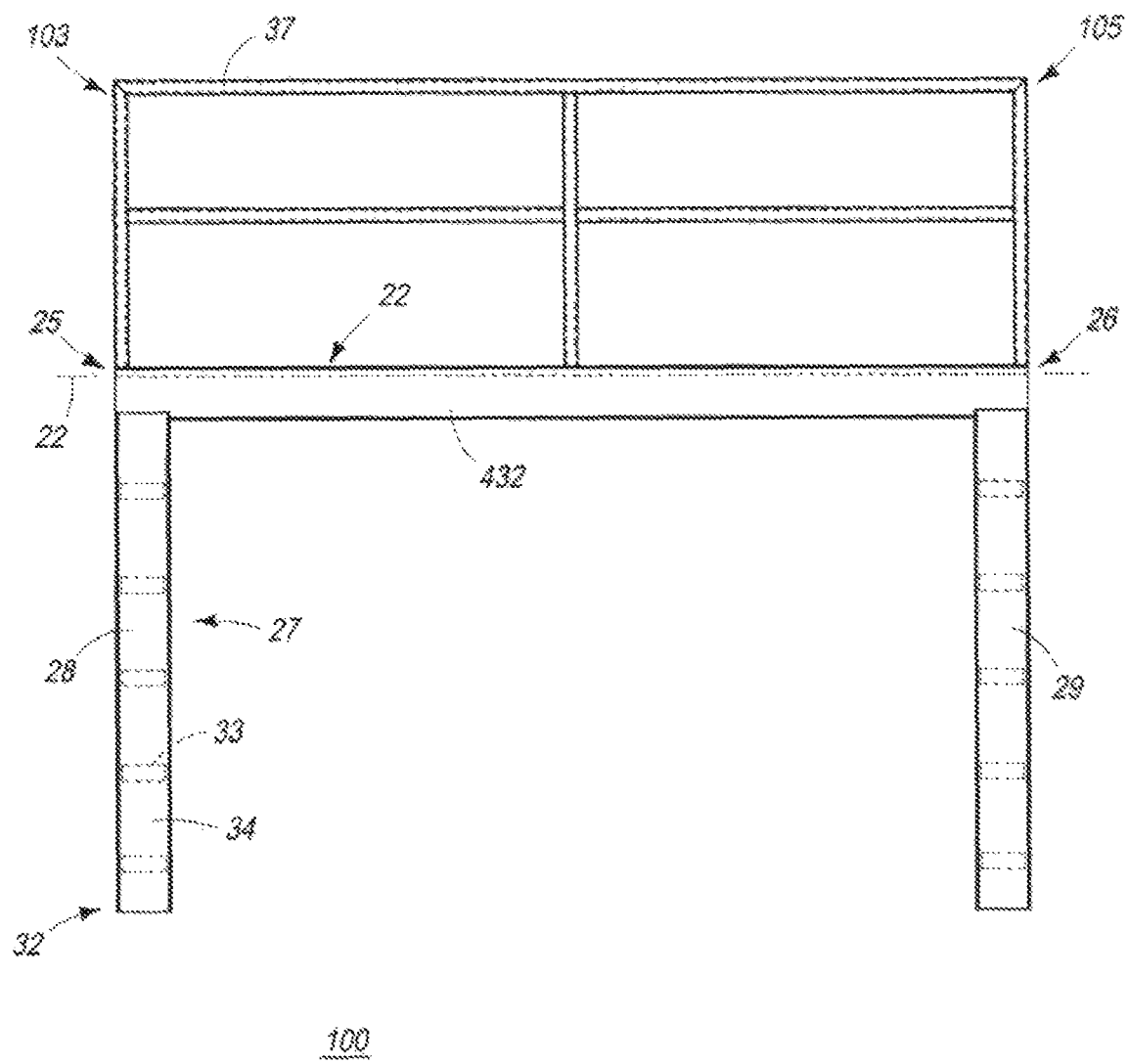
FIG. 4 is an enlarged front elevation of the walkway and ladders of the fluid storage tank trailer shown generally in FIG. 3.
Figure 5:
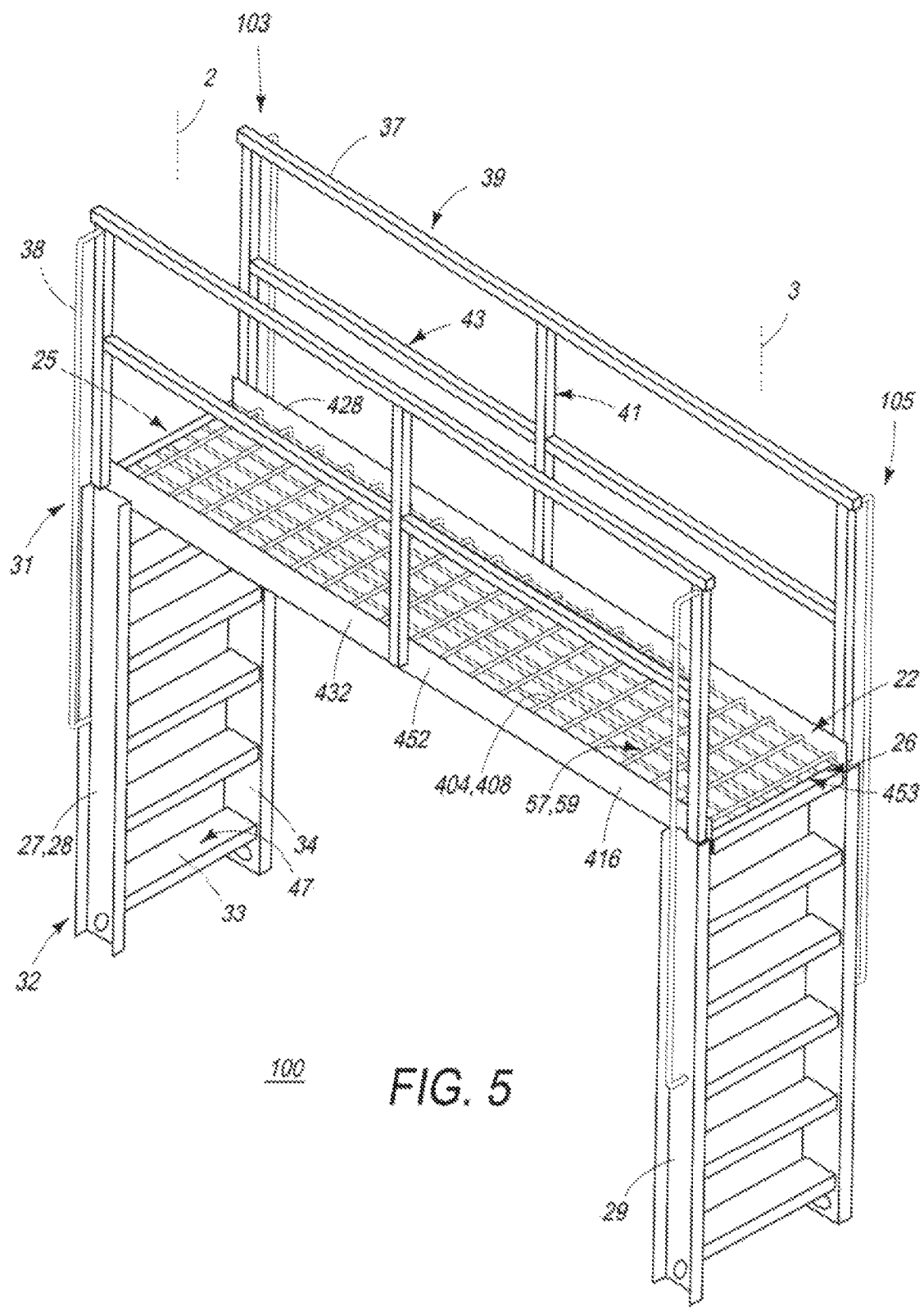
FIG. 5 is an enlarged front perspective view of the walkway and ladders of FIG. 4.
Figure 6:
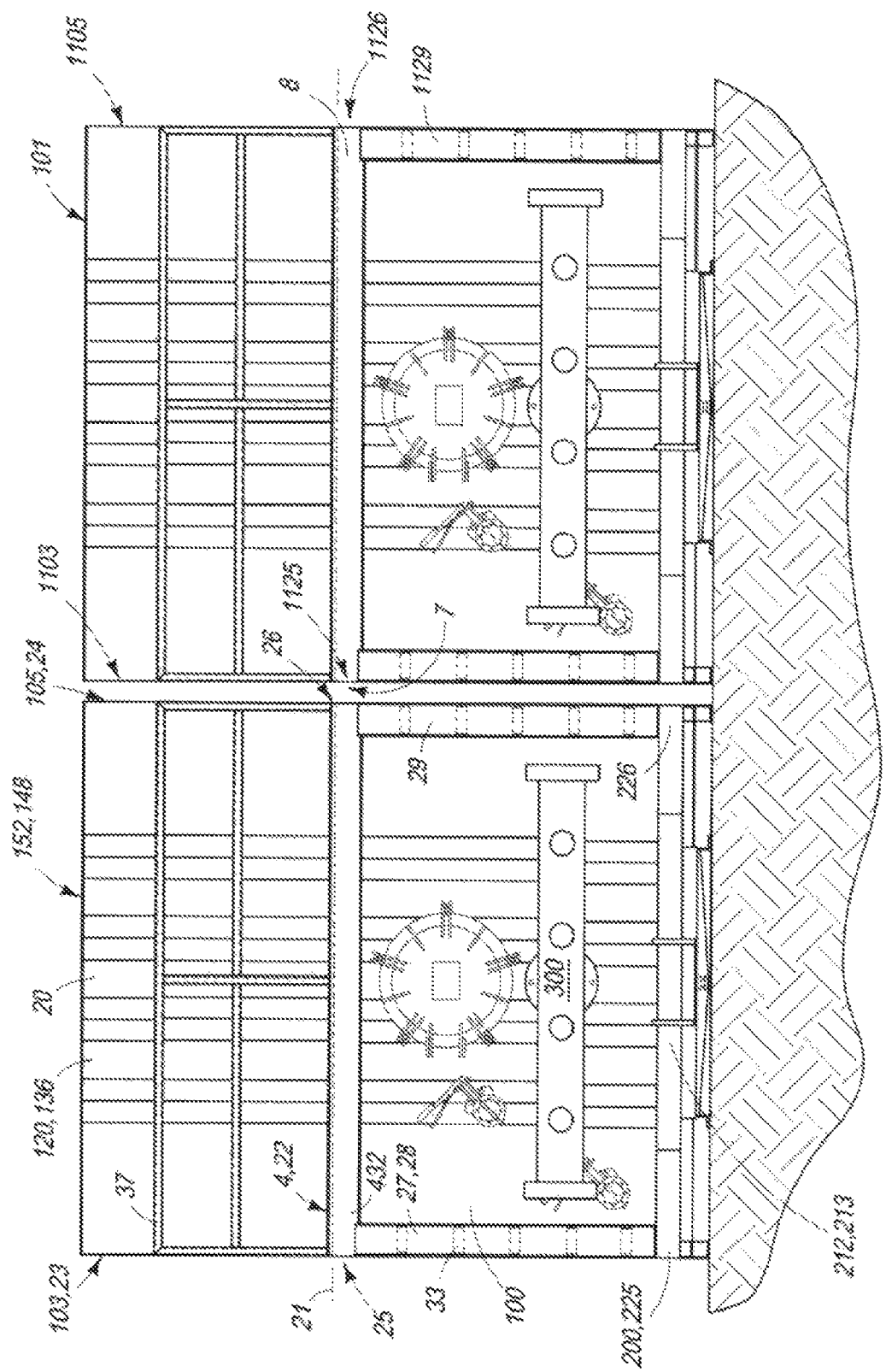
FIG. 6 is an enlarged front elevation view of a fluid storage tank trailer shown generally in FIG. 1 adjacent a second fluid storage tank trailer of identical construction.

Returning to FIG. 3, FIG. 4 and FIG. 5 it will be understood that, according to embodiments, trailer 100 includes at least one ladder 27. Ladder 27 can be of any suitable construction. It will be understood that ladder 27 extends generally in the vertical direction and is located to provide access for an operator to move from the ground to walkway 22. It will be appreciated that, in the specific embodiment illustrated in FIG. 1 through FIG. 6, ladder 27 includes a pair of first and second ladders 28,29. The first and second ladders 28,29 extend in the vertical direction along respective of first and second vertical ladder axes 2,3. It will be appreciated that first ladder 28 and second ladder 29 are generally identical, except as otherwise described herein. First ladder 28 will be further described. As shown in FIG. 3, first ladder 28 has an upper end 31 located at first end 25 of walkway 22. First ladder 28 extends downward in the vertical direction from upper end 31 to first forward outer frame member 225 of forward frame 200. First ladder 28 has a lower end 32 spaced from upper end 31. Lower end 32 is located at first forward outer frame member 225. In the specific embodiment illustrated, lower end 32 is joined in fixed relationship with first forward outer frame member 225, such that lower end 32 is supported thereby. First ladder 28 includes a spaced pair of vertical stringers 34. Each stringer 34 is an elongated rigid structural member having spaced upper and lower ends. It will be understood that stringers 34 can be formed of any suitable material. In the specific embodiment illustrated in FIG. 5, each stringer 34 is formed of a carbon steel beam. It will be appreciated that first ladder 28 includes a set of spaced steps 33 supported by stringers 34. Each step 33 extends between the pair of stringers 34. Each step 33 defines a respective tread 47. Tread 47 is suitable to receive the feet of an operator ascending and descending first ladder 28. It will be understood that steps 33 are supported by stringers 34 in any suitable manner. In the specific embodiment illustrated in FIG. 5, each step 33 is joined to each stringer 34 by weld seams (not shown). Steps 33 are formed of any suitable material. In the embodiment illustrated in FIG. 1, steps 33 are formed of suitable metal which is galvanized steel. In the specific embodiment illustrated in FIG. 5, steps 33 are formed of open lattice perforated galvanized steel grid 57 having skid resistant upper surface serrations (not shown) defining tread surfaces 59. Lower end 32 can be joined to first forward outer frame member 225 in a suitable manner, such as by a bracket and fastener combination (not shown in FIG. 3). In the specific embodiment illustrated, as shown in FIG. 5 lower end 32 has therein a pair of identical bolt holes 33. Each bolt hole 33 is located to receive a respective fastener which, in the specific embodiment illustrated, is a bolt and nut combination (not shown). It will be understood that bolt and nut fasteners are received in the bolt holes 33 and mating brackets (not shown) affixed to the first forward outer frame member 225. It will be appreciated that first ladder 28 extends downward in a generally vertical direction from walkway 22 at elevated position 21. It will be understood that first ladder 28 terminates in proximity to at least one of the ground and the forward frame 200 to enable the operator to ascend first ladder 28 from the ground to walkway 22. It will be appreciated that first ladder 28 extends in the vertical direction on first side 103 to enable the operator to ascend from the ground adjacent first side 103 to first end 25 of walkway 22 adjacent first front corner 23. As shown in FIG. 6, it will be appreciated that first ladder 28 extends in the vertical direction on first side 103 to enable the operator to ascend first ladder 28 from the ground adjacent first side 103 to first end 25 of walkway 22 of trailer 100, to walk across walkway 22 all the way from first end 25 and first side 103 to second end 26 and second side 105, to step from second end 26 on to adjacent first end 1125 of second walkway 8 of second trailer 101, to walk across second walkway 8 to second send 1126, and descend second ladder 1129 from second walkway 8 to the ground adjacent second side 1105. As shown in FIG. 6, the operator thus can travel in the lateral direction across walkways 22,8 of respective trailer 100 and adjacent second trailer 101 at elevated position 21.

Referring to FIG. 5, first ladder 28 includes a plurality of vertically spaced steps 33 (FIG. 5) supported by a pair of spaced vertical stringers 34. Each stringer 34 is an elongated rigid structural member paced from first vertical ladder axis 2 in parallel relation thereto. In the specific embodiment illustrated, opposite upper and lower ends of each stringer 34 are joined in fixed relationship to respective of walkway 22 and forward frame 200. Stringers 34 can be joined to walkway 22 and forward frame 200 in any suitable manner. In the specific embodiment illustrated, the upper end 31 of each stringer 34 is joined by a respective weld seam (not shown) to walkway 22. The lower end 32 of each stringer 34 has therein a bolt hole 33 which receives a threaded bolt and nut combination (not shown). The bolt and nut combination is received in a respective bracket or projection (not shown) which is welded to first forward outer frame member 225. It will be appreciated that the pair of stringers 34 support walkway 22 above forward frame 200.

Walkway 22 includes a pair of spaced, generally parallel handrails 37 which prevent the operator from falling off walkway 22. It is to be understood that handrails 37 can be of any suitable construction. In the specific embodiment illustrated in FIG. 5, each handrail 37 is identical. Each handrail 37 includes a spaced pair of elongate upper and lower horizontal rails 39,43 which extend in parallel relation from first end 25 to second end 26 of walkway 22 above a respective one of the inner edge 428 and the outer edge 432. It will be appreciated that handrails 37 include suitable vertical members 41 which support the upper and lower horizontal rails 39,43 in fixed relation to walkway 22. It will be appreciated that, in the specific embodiment illustrated in FIG. 5, each handrail 37 includes three spaced vertical members 41. A pair of grab irons 38 (FIG. 5) extends in the vertical direction down from each handrail 37 to a respective stringer 34 of first ladder 28. The grab irons 38 are positioned to be grasped by the operator to steady himself when ascending first ladder 28 and when moving from upper end 31 of first ladder 28 to first end 25 of walkway 22.

It will be appreciated that second ladder 29 is generally identical to first ladder 28 as described in the preceding paragraph. Second ladder has an upper end 31 which terminates at second end 26 of walkway 22. Second ladder 29 extends downward in the vertical direction to second forward outer frame member 226 of forward frame 200. In the specific embodiment illustrated, second ladder 29 is joined in fixed relationship with second forward outer frame member 226. It will be appreciated that second ladder 29 extends downward in a generally vertical direction from walkway 22 at elevated position 21. It will be understood that second ladder 29 terminates in proximity to at least one of the ground and the forward frame 200 to enable the operator to ascend from the ground up second ladder 28 to second end 26 of walkway 22. It will be appreciated that second ladder 29 extends in the vertical direction on second side 105 to enable the operator to ascend from the ground adjacent second side 105 to second end 26 of walkway 22 adjacent second front corner 24.

According to embodiments, trailer 100 includes forward platform 4, first ladder 28, and second ladder 29 which cooperate to enable an operator to move across trailer 100 from the ground on the first side 103 to the ground on the second side 105, and in the reverse direction. An operator being enabled to move across trailer 100 from the ground on the first side 103 to the ground on the second side 105 by moving across forward platform 4, first ladder 28, and second ladder 29 can avoid stepping around the forward frame 200 in front of the heavy duty nose bar 213 and can avoid stepping over numerous fluid hoses connected to manifold header 308 and routed to a drilling rig. According to embodiments, an operator is enabled to move directly across trailer 100 from the ground on the first side 103 to the ground on the second side 105 by moving across forward platform 4, first ladder 28 and second ladder 29 along a relatively short, straight, unobstructed path.

It will be observed in FIG. 6 that trailer 100 is aligned in parallel relationship with adjacent second trailer 101. It will be appreciated that second trailer 101 is identical to trailer 100. It will be appreciated that a plurality of identical trailers 100,101 can be positioned in a row and aligned in parallel, side-by-side relationship. More particularly, it will be appreciated that second end 26 of walkway 22 of trailer 100 is aligned with respective first end 7 of second walkway 8 of second trailer 101 when trailer 100 is positioned in parallel, side-by-side, aligned relationship with adjacent second trailer 101. Walkway 22 being aligned with and adjacent to second walkway 8 at common elevated position 21 permits and enables the operator to walk at elevated position 21 in a continuous, generally straight path across a plurality of adjacent, aligned trailers 100 and second trailers 101 without descending from a plurality of respective walkways 22 and second walkways 8 at elevated position 21 and without returning to the ground. As used herein, the term "continuous, straight path" means that the operator can walk in a generally straight path across walkway 22 of trailer 100 onto an adjacent, aligned second walkway 8 of an adjacent, aligned second trailer 101 without the necessity of departing or descending from either walkway 22 or second walkway 8 intermediate the other of walkway 22 and second walkway 8. It will be appreciated that, according to embodiments, the operator can choose to descend or depart from walkway 22 or second walkway 8 via one or more ladders 27, but it is not necessary to descend or depart via an access ladder 27 in order for the operator to continue along an uninterrupted walk at the elevated position 21 across a plurality of aligned, adjacent walkways 22 and second walkways 8 of a plurality of aligned, side-by-side trailers 100 and second trailers 101. In view of the foregoing, it will be understood that walkway 22 being aligned with and adjacent to walkway 8 at common elevated position 21 permits and enables the operator to walk in a continuous, generally straight path across a plurality of commonly aligned, adjacent walkways 22 of a plurality of aligned, adjacent trailers 20 positioned in a row in parallel, side-by-side relationship. It will be appreciated that the plurality of adjacent identical trailers 100,101 can be aligned in a row in both head-in and head-out orientations, so long as walkways 22 of adjacent trailers 100,101 are aligned with each other. One skilled in the art will appreciate that all of a plurality of adjacent trailers 100,101 in each row can be aligned in common front to rear orientation, either in head-in orientation or in head-out orientation, such that all fluid hoses connected to respective manifold assemblies 300 of the plurality of adjacent trailers 100,101 are all located on a common side of the row. One skilled in the art will appreciate that the terms "head-in" and "head-out" can refer to the relative orientation or direction of the front and rear of a trailer parked in a row of stationary trailers. Although use of the terms can vary, as used herein, the terms "head-in" and "head out" are used to indicate whether trailers are headed at front and rear in a common direction or different directions. According to embodiments, and as best shown in FIG. 6, a plurality of identical trailers 100,101 are aligned side by side in a row, such that an operator on foot can walk across forward platforms 4,8 of each trailer 100,101 at elevated height 21 along a relatively short, straight, unobstructed path, without stepping around the forward frames 200 and heavy duty nose bars 213, and without stepping over numerous fluid hoses connected to manifold header 308 and routed to the drill rig.

Figure 7:
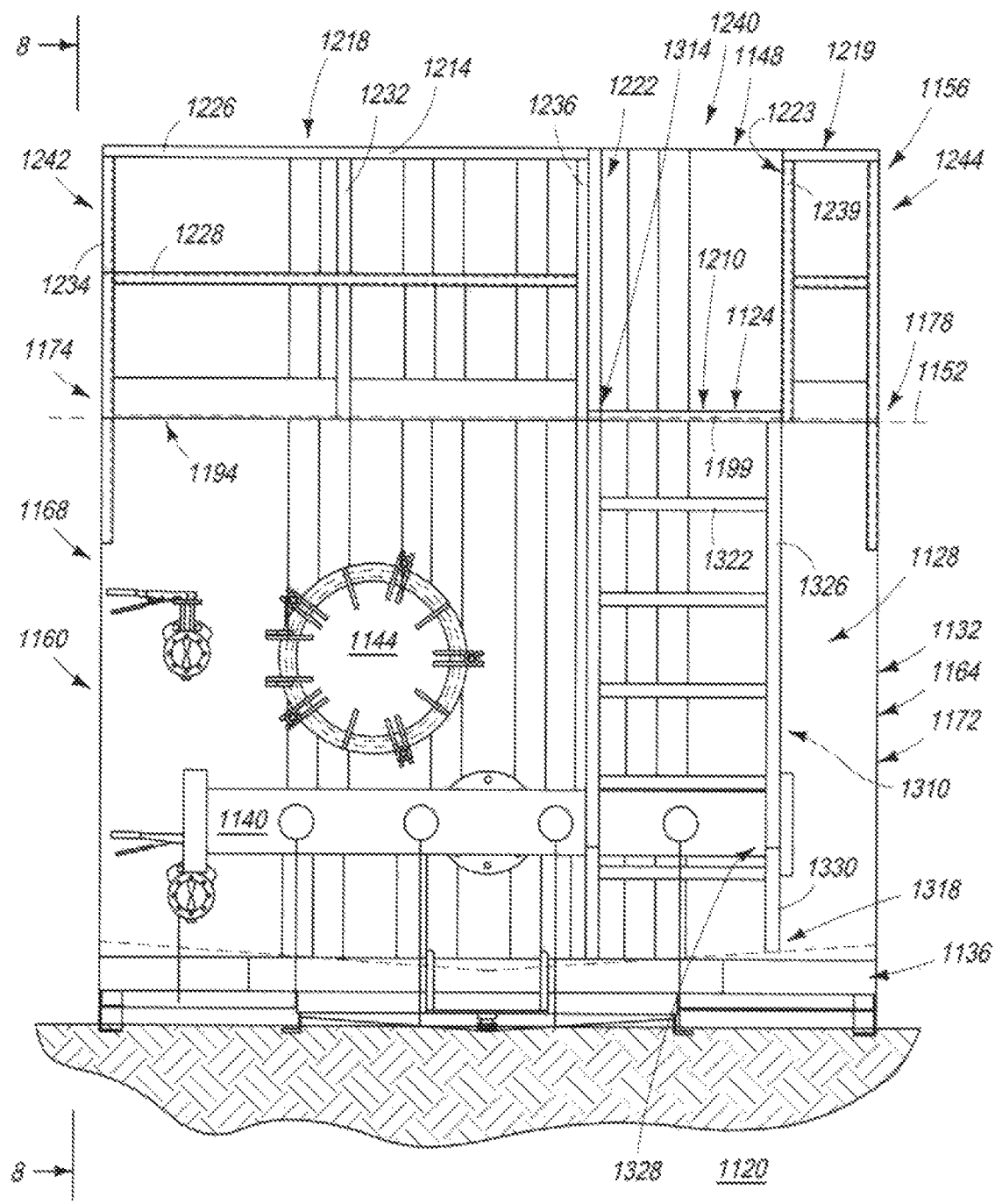
FIG. 7 is a simplified front elevation view of a fluid storage tank trailer according to an embodiment, with pin latches and grab irons omitted for simplicity.

Illustrated in FIG. 7 is a fluid storage tank trailer 1120 according to an embodiment. It will be appreciated that fluid storage tank trailer 1120 is identical to fluid storage tank trailer 100 except as otherwise described here or as otherwise illustrated in FIG. 7, FIG. 8, FIG. 9 or FIG. 10. Trailer 1120 includes forward platform 1124. Forward platform 1124 is generally identical to forward platform 4 of trailer 100, except as otherwise described herein. Forward platform 1124 is supported in a fixed position adjacent front wall 1128 of tank 1132 and generally above forward frame 1136, manifold assembly 1140 and forward manhole 1144. Forward platform 1124 is located relative to upper edge 1148 of front wall 1128 of tank 1132 at a height or elevated position 1152 suitable for an operator standing on forward platform 1124 to view the roof 152 of tank 1132 from an elevated line of sight. In the specific embodiment illustrated, forward platform 1124 is located relative to upper edge 1148 at elevated horizontal axis or elevated position 1152 at a height suitable for an operator standing on forward platform 1124 to manually reach and move at least the front one of the access lids 184 (identical to access lid 184 previously shown in FIG. 2) relative to the front one of the access portals 180 adjacent front wall 1128 (FIG. 7) on the roof 152 to enable the operator when standing on forward platform 1124 to view along an elevated line of sight into the interior space (not shown) of tank 1132 through the front one of the access portals 180. It will be understood that forward platform 1124 can be constructed and supported in any suitable manner. It will also be understood that forward platform 1124 can be of any desired shape and size. In the specific embodiment illustrated in FIG. 7, forward platform 1124 defines a generally rectangular walkway 1156 at elevated position 1152. It will be understood that elevated position 1152 includes all vertical locations above forward frame 1136. It will be understood that, according to embodiments (not shown), elevated position 1152 can include locations above, at identical height with, and below upper edge 1148 of tank 1132. In the specific embodiment illustrated in FIG. 7, walkway 1156 extends in the transverse direction along front wall 1128 of tank 1132 between first side 1160 and second side 1164. More particularly, in the specific embodiment illustrated in FIG. 7, walkway 1156 extends in the transverse direction adjacent front wall 1128 at elevated position 1152 between respective first and second front corners 1168,1172 of tank 1132. It will be appreciated by reference to FIG. 10 that, in the specific embodiment illustrated, each of the first and second front corners 1168,1172 has a continuous radius. In other embodiments (not shown), the first and second corners 1168,1172 each define a 90 degree angled corner lacking a continuous radius. Returning to FIG. 7, walkway 1156 includes spaced first and second ends 1174, 1178. First and second ends 1174,1178 terminate at respective of the first and second front corners 1168,1172. It will be appreciated that first end 1174 is located adjacent tank 1132 at first side 1160 and at elevated position 1152. It will be appreciated that second end 1178 is located adjacent tank 1132 at second side 1164 and at elevated position 1152. Walkway 1156 thus is positioned and dimensioned to enable the operator to walk along and adjacent front wall 1128 of tank 1132 at elevated position 1152 between first side 1160 and second side 1164. It will be understood that the operator thus can stand, view and access tank 1132, as elsewhere described herein, from walkway 1156 at elevated position 1152 from any location in the lateral direction between first end 1174 at first side 1168 and second end 1178 at second side 1172.

Figure 8:
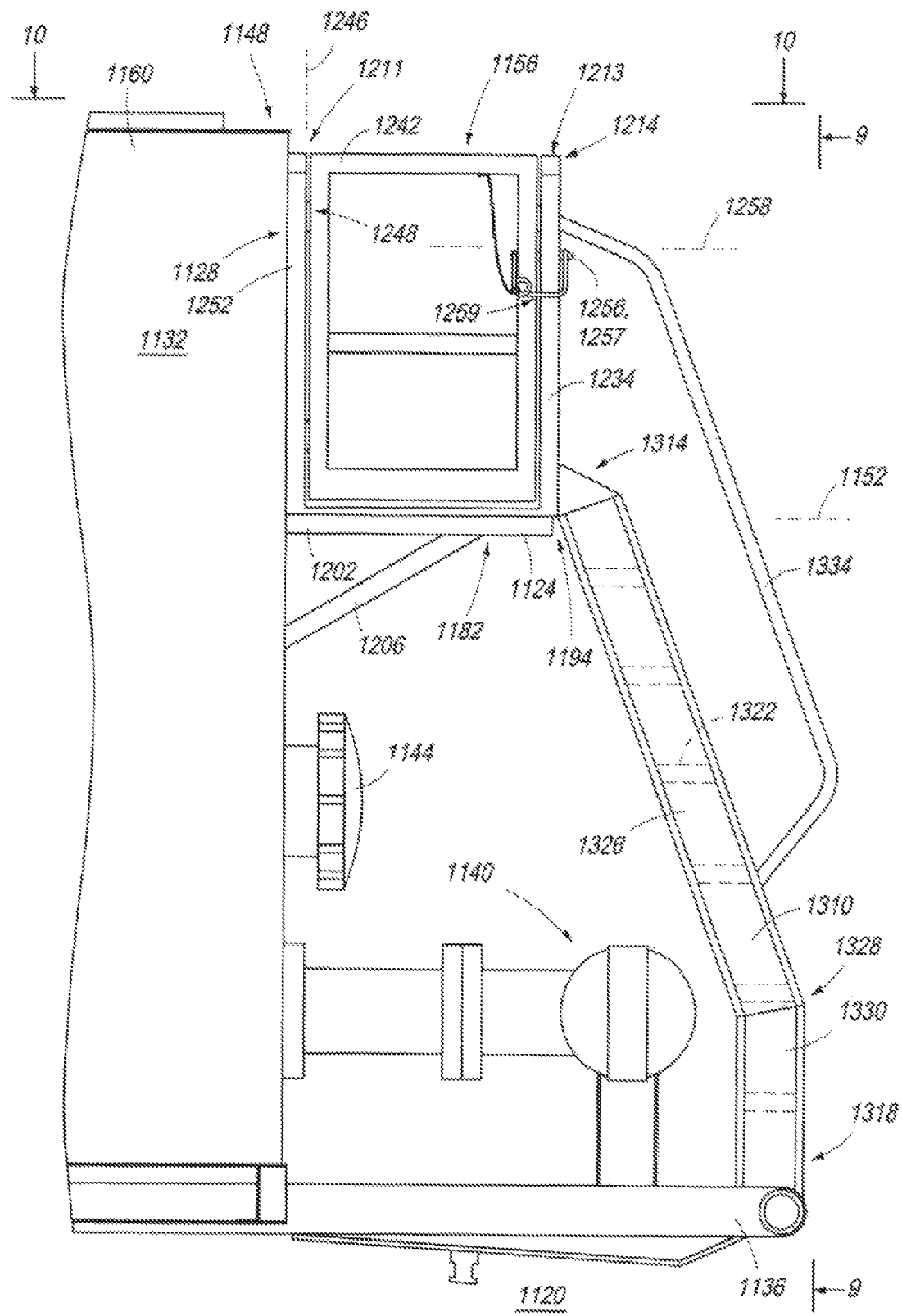
FIG. 8 is a partial side view taken generally along 8-8 in FIG. 7, showing in isolation a forward platform and ladder.
Figure 9:
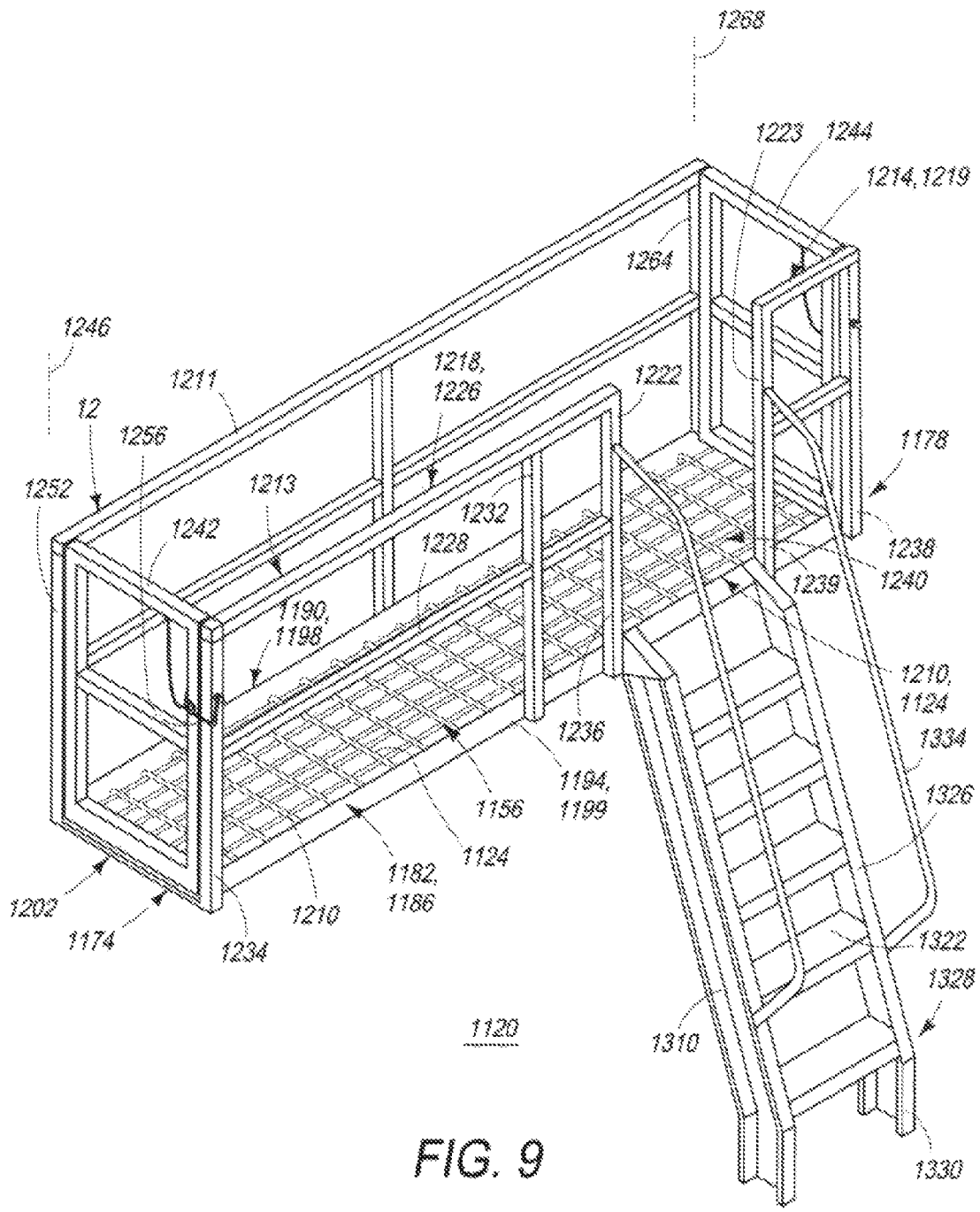
FIG. 9 is a partial front perspective isolation view taken generally along 9-9 in FIG. 8.
Figure 10:
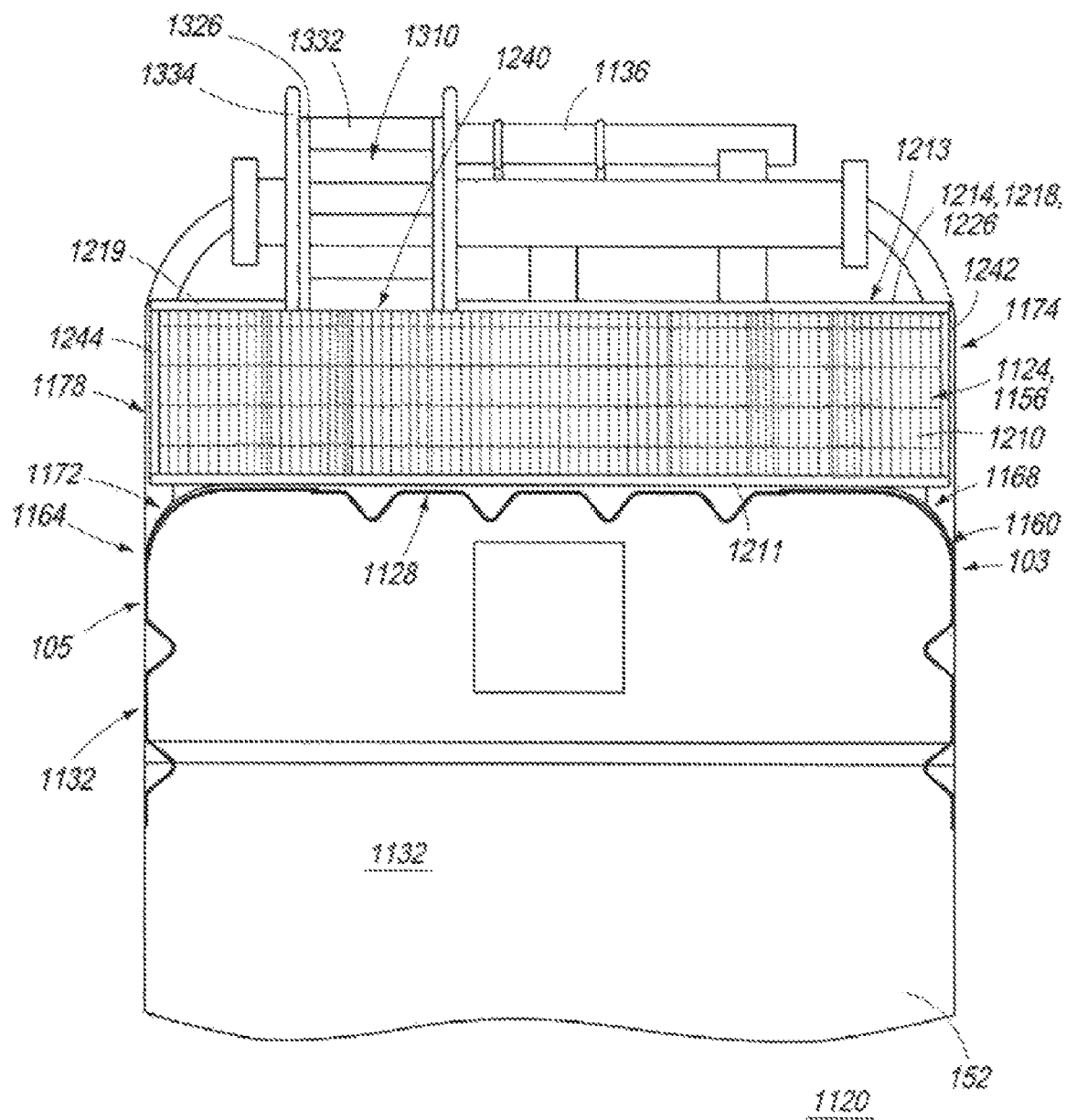
FIG. 10 is a partial top view taken generally along 10-10 in FIG. 8, showing platform framing, with first and second safety gates and ladder omitted for clarity.

It will be appreciated that forward platform 1124 can be constructed in any suitable manner. In the specific embodiment illustrated in FIG. 7, forward platform 1124 includes a platform frame 1182. Referring to FIG. 9, platform frame 1182 is constructed of suitable frame members 1186 as elsewhere described for trailer 100. In the specific embodiment illustrated in FIG. 8, platform frame 1182 includes an inner edge 1190 adjacent front wall 1128 and outer edge 1194 in spaced, parallel relation to inner edge 1190. It will be appreciated that inner edge 1190 is defined by a respective inner major frame member 1198, and outer edge 1194 is defined by a respective outer major frame member 1199. Platform frame 1182 includes a pair of minor frame members 1202 extending between inner major frame member 1198 and outer major frame member 1199 in perpendicular relation thereto. Platform frame 1182 includes a pair of platform frame braces 1206 (FIG. 8). It will be understood that platform frame 1182 can be supported above forward frame 1136 in any suitable manner. In the specific embodiment illustrated in FIG. 8, a lower end of each platform brace 1206 is joined to front wall 1128 (FIG. 8) and an opposite, upper end of each platform brace 1206 is joined to a respective minor frame member 1202 near outer edge 1194. It will be appreciated that platform braces 1206 can be configured and arranged differently. In the specific embodiment illustrated, inner major frame member 1198 is joined to front wall 1128 in a suitable manner. It will be appreciated that platform braces 1206 cooperate with inner major frame member 1198 and front wall 1128 to support forward platform 1124 above forward frame 1136. Forward platform 1124 includes a platform floor 1210 supported by platform frame 1182. Platform floor 1210 is generally identical to platform floor 404 of trailer 100. In the specific embodiment illustrated in FIG. 7, platform floor 1210 is defined by floor grate formed of open lattice perforated galvanized steel having skid resistant upper surface serrations, as previously described for platform floor 404 of trailer 100. It will be understood that platform floor 1210 can be formed of any suitable material.

Referring to FIG. 9, forward platform 1124 includes handrail 1214. Handrail 1214 is supported above platform floor 1210. More particularly, handrail 1214 is supported above outer edge 1194, above inner edge 1190, and above first and second ends 1174,1178 of platform floor 1210. Handrail 1214 includes inner major handrail 1211 and outer major handrail 1213 extending in spaced parallel relation thereto. Outer major handrail 1213 of handrail 1214 includes major stationary handrail section 1218 and minor stationary handrail section 1219. Major stationary handrail section 1218 is spaced above outer edge 1194. Major stationary handrail section 1218 extends from first end 1174 to a major terminal end 1222. It will be appreciated that major terminal end 1222 is intermediate first end 1174 and a minor terminal end 1223. Major stationary handrail section 1218 and minor stationary handrail section 1219 each include an upper horizontal rail 1226 and a lower horizontal rail 1228 extending between and supported by spaced vertical posts 1232. Major stationary handrail section 1218 includes first outer corner post 1234 and major terminal post 1236 at major terminal end 1222. Minor stationary handrail section 1219 includes second outer corner post 1238 and minor terminal post 1239 at minor terminal end 1223. A ladder gap or ladder opening 1240 is defined between major terminal post 1236 and minor terminal post 1239. Handrail 1214 includes a pair of movable first and second safety gates 1242,1244. It will be understood that first safety gate 1242 is supported above first end 1174, and second safety gate 1244 is supported above second end 1178. First safety gate 1242 is supported for pivotal movement about a first pivot axis 1246 (FIG. 8) between a closed position and an open position (not shown). First safety gate 1242 is supported by a first set of hinges 1248 for pivotal movement relative to a first inner corner post 1252. It will be appreciated that first inner corner post 1252 is supported in fixed relation to platform floor 1210 at the intersection of inner edge 1190 and first end 1174. First inner corner post 1252 supports first safety gate 1242 via the first set of hinges 1248. First safety gate 1242 includes a gate closure device 1256 opposite the first set of hinges 1248. Gate closure device 1256 is selectively operable to secure first safety gate 1242 in the closed position. Gate closure device 1256 is selectively operable to release first safety gate 1242 for pivotal movement about first pivot axis 1246 between the closed position (FIG. 8) and the open position (not shown). It will be understood that gate closure device 1256 can be of any suitable configuration. In the specific embodiment illustrated, gate closure device 1256 is defined by a retractable locking pin 1257 which is selectably captured in a horizontal aperture (not shown) in first outer corner post 1234 (see FIG. 8). Retractable locking pin 1257 is slidable along a horizontal axis 1258 to selectively engage the horizontal aperture and to be captured in the stationary first outer corner post 1234 when first safety gate 1242 occupies the closed position. It will be appreciated that gate closure device 1256 includes a retainer clip 1259 which secures retractable locking pin 1257 in the horizontal aperture to secure first safety gate 1242 in the closed position unless otherwise operated by hand. It is to be understood that first safety gate 1242 is stationary when retained in the closed position by operation of gate closure device 1256 to capture first outer corner post 1234. It will be understood that second safety gate 1244 is generally identical and is operable in identical manner to first safety gate 1242. Second safety gate 1244 is supported by a second set of hinges (not shown) mounted on second inner corner post 1264 for pivotal movement about a respective second pivot axis 1268 between a closed position (FIG. 9) and an open position (not shown). Second safety gate 1244 is stationary when retained in the closed position by operation of the gate closure device. It will be appreciated that walkway 1156 defined by forward platform 1124 extends between spaced first and second ends 1174,1178. The first and second safety gates 1242,1244 are selectively operable by hand to permit an operator to walk across respective of first and second ends 1174,1178 onto adjacent walkways (not shown) of adjacent trailers aligned in parallel, side-by-side relationship, in the same manner as elsewhere described with reference to trailer 100 and second trailer 19. As elsewhere described with reference to trailer 100 (and generally shown in FIG. 6), it will be appreciated that second end 1178 of walkway 1156 of trailer 1120 is aligned with a respective first end of a second walkway of an identical, adjacent second trailer (not shown) positioned in parallel, aligned, side-by-side, relationship. Walkway 1156 being aligned with and adjacent to second walkway of second trailer (not shown) at common elevated position 1152 permits and enables the operator to walk at elevated position 1152 in a continuous, generally straight path across a plurality of adjacent, aligned trailers 1156 and second trailers (not shown) without descending from elevated position 1152 and without returning to the ground.

Returning to FIG. 8, it will be understood that trailer 1120 includes ladder 1310. Ladder 1310 can be of any suitable construction. It will be understood that ladder 1310 extends generally in the vertical direction and is located to provide access for an operator to move upward from forward frame 1136 to forward platform 1124 defining walkway 1156. It will be appreciated that an operator can step from the ground onto forward frame 1136 and thereafter ascend ladder 1310 to forward platform 1124. It will be appreciated that an operator can descend from forward platform 1124 on ladder 1310 to forward frame 1136 and then to the ground. In the specific embodiment illustrated in FIG. 8, ladder 1310 has an upper end 1314 located at outer edge 1194 of forward platform 1124. More particularly (see FIG. 9), upper end 1314 of ladder 1310 intersects outer edge 1194 at ladder gap or ladder opening 1240 intermediate major terminal post 1236 and minor terminal post 1239 of handrail 1214. Ladder 1310 has a lower end 1318 spaced below upper end 1314. As shown in FIG. 8, ladder 1310 is slightly inclined from lower end 1318 to upper end 1314, such that lower end 1318 is spaced apart from an imaginary vertical plane (not shown) defined by outer edge 1194 and upper end 1314. More particularly, lower end 1318 is spaced in the forward direction from an imaginary vertical plane defined by outer edge 1194. Ladder 1310 includes a plurality of steps 1322 spaced at generally equal vertical intervals between forward frame 1136 and outer edge 1194 of forward platform 1124. Ladder 1310 includes a pair of elongated stringers 1326 extending in spaced, parallel relation and supporting the plurality of steps 1322. The pair of stringers 1326 has therein a slight bend 1328 at a short vertical segment or vertical transition 1330 above lower end 1318. The vertical transition 1330 confines or reduces horizontal space requirement or footprint of ladder 1310 at forward frame 1136. The vertical transition 1330 also provides vertical clearance of ladder 1310 above manifold assembly 1140 (FIG. 8) with reduced horizontal space requirement or footprint of ladder 1310 by reducing horizontal spacing necessary between lower end 1318 and manifold assembly 1140 at forward frame 1136. The vertical transition 1330 also provides space between ladder 1310 and manifold assembly 1140 for fluid hoses (not shown) to be attached to manifold assembly 1140. Thus, ladder 1310 includes vertical transition 1330 to clear manifold assembly 1140 and fluid hoses (not shown) attached thereto in minimal or reduced horizontal space between an imaginary vertical plane defined by outer edge 1194 and lower end 1318 at forward frame 1136. It will be appreciated that lower end 1318 is affixed to forward frame 1136 in a manner suitable to support ladder 1310 in a fixed position. It will also be appreciated that upper end 1314 is affixed to forward platform 1120 in a manner suitable to support upper end 1314 of ladder 1310 in a fixed position. In the specific embodiment illustrated, lower end 1318 and upper end 1314 are affixed by respective weld seams (not shown). Ladder 1310 includes a pair of spaced, parallel grab rails 1334 (shown in FIG. 8; omitted from FIG. 7). Grab rails 1334 extend from ladder 1310 to handrail 1214 in spaced relation to respective of the pair of stringers 1326. Grab rails 1334 are located to permit an operator to steady himself when ascending and descending ladder 1310. It will be understood that ladder 1310 being slightly inclined and including grab rails 1334 provides ease of use and increases operator safety during use in comparison to a perfectly vertical ladder.

Figure 11:
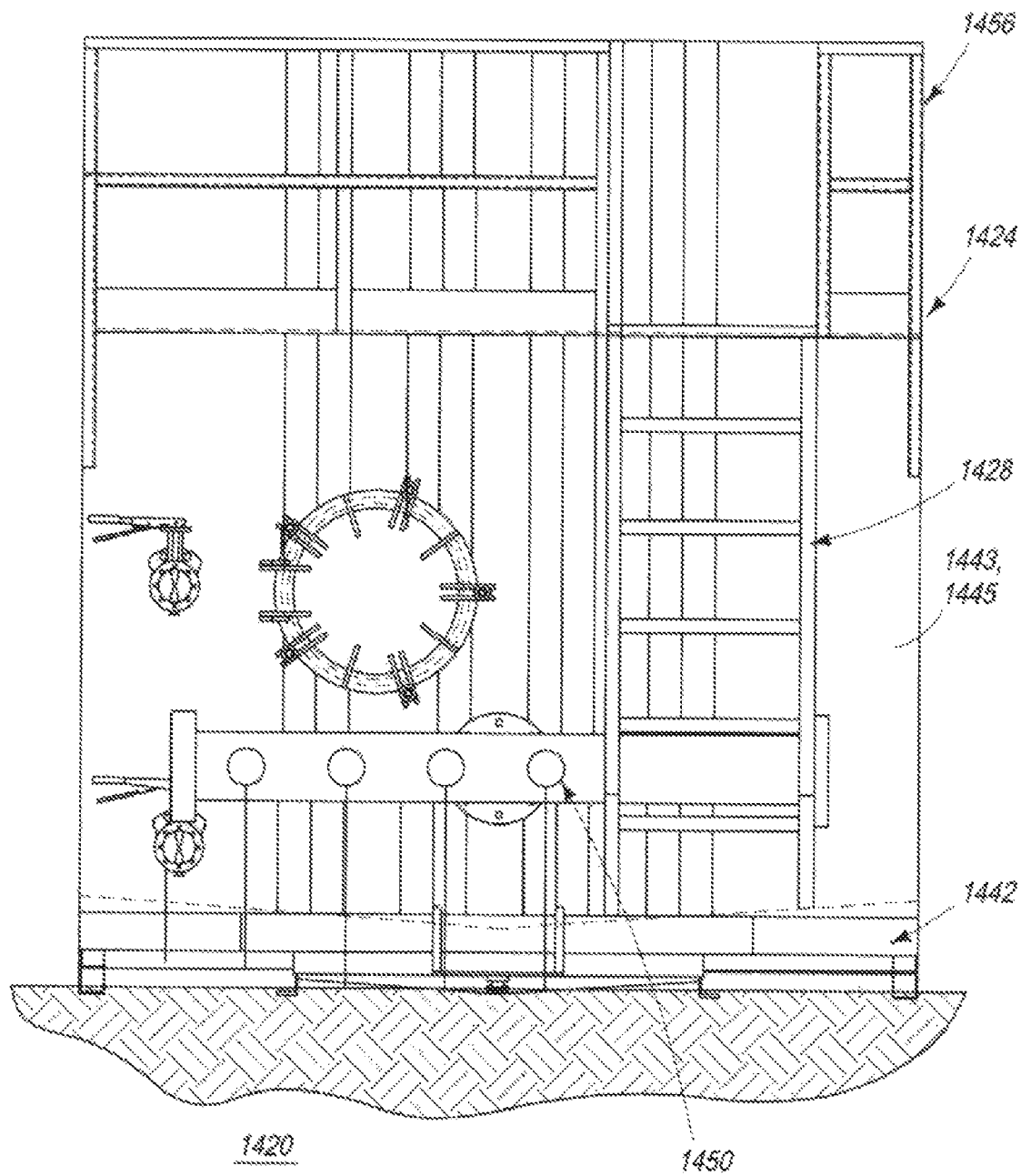
FIG. 11 is an enlarged front elevation view similar to FIG. 7, showing a fluid storage tank trailer according to an embodiment.

Illustrated in FIG. 11 is a fluid storage tank trailer 1420 according to an embodiment. It will be appreciated that fluid storage tank trailer 1420 is identical to fluid storage tank trailer 1120 except as otherwise described here or as otherwise illustrated in FIG. 11. Trailer 1420 includes forward platform 1424 and ladder 1428. Forward platform 1424 and ladder 1428 are generally identical to forward platform 1124 and ladder 1310 of trailer 1120. Forward platform 1424 defines walkway 1456. Trailer 1420 includes manifold assembly 1440. Manifold assembly 1440 is supported above forward frame 1442. Manifold assembly 1440 includes a set of offset manifold ports 1450. The set of offset manifold ports 1450 are spaced away from ladder 1428. Manifold assembly 1440 including offset manifold ports 1450 has no ports behind ladder 1428 in the direction of front wall 1443 of tank 1445. Offset manifold ports 1450 being spaced away from ladder 1428 permits fluid hoses (not shown) to be connected without spacial interference by ladder 1428. It will be appreciated that manifold assembly 1440 has no forward facing manifold ports located intermediate or directly between ladder 1428 and front wall 1443 in the space behind ladder 1428 and defined by a longitudinal projection of ladder 1428 in the direction of front wall 1443. It will be appreciated that manifold assembly 1440 has no forward facing ports in the area defined directly below or between inclined ladder 1428 and forward frame 1442.

One of skill in the art will appreciate that embodiments provide improved fluid storage tank trailers. One of skill in the art will appreciate that embodiments provide improved fluid storage tank trailers adapted for storage of fluids at drilling sites for oil and gas wells. Although specific embodiments are illustrated and described herein, it will be appreciated by those of ordinary skill in the art that any arrangement which is calculated to achieve the same purpose can be substituted for the specific embodiments shown. This specification is intended to cover any adaptations or variations of embodiments. For example, although described in terms of the specific embodiments, one of ordinary skill in the art will appreciate that implementations can be made in different embodiments to provide the required function. In particular, one of skill in the art will appreciate that the names and terminology are not intended to limit embodiments. Furthermore, additional apparatus can be added to the components, functions can be rearranged among components, and new components corresponding to future enhancements and future physical devices used in embodiments can be introduced without departing from the scope of embodiments. The terminology used in this application is intended to include all environments and alternatives which provide the same functionality as described herein.

I claim:

1. A fluid storage tank trailer, the trailer having an elongated first side, a second side spaced from the first side in parallel relation therewith, a rear end extending between the first side and the second side, and a front end spaced from the rear end in a forward direction, the trailer comprising:
    a base, the base including a set of rear wheels mounted to engage the ground for rolling movement relative thereto;
    a tank supported by the base, the tank having a first side wall extending generally along the first side, the tank having a second side wall extending generally along the second side, the tank having a rear wall extending between the first side wall and the second side wall, the tank having a front wall spaced from the rear wall, the tank having a first front corner defined by intersection of the front wall and the first side wall, the tank having a second front corner defined by intersection of the front wall and the second side wall, the tank having a tank bottom, the tank having an internal space suitable to contain fluid material;
    the base including a set of skids beneath the tank, the skids being adapted to engage the ground forward of the rear wheels when the trailer is not connected to a tow vehicle, the skids being adapted to support the tank bottom in relation to the ground;
    a forward frame extending from generally beneath the tank to the front end, the forward frame including a nose bar at the front end, the forward frame being adapted to be towed by a tow vehicle;
    a forward platform adjacent the front wall, the forward platform being elevated above the forward frame, the forward platform having a first end adjacent the first front corner, the forward platform having a second end adjacent the second front corner, the forward platform defining a walkway, the walkway extending between the first end and the second end at a vertical position, the vertical position being elevated above the forward frame;
    a first safety gate disposed above the first end at the first side;
    a second safety gate disposed above the second end at the second side; and
    a single ladder extending downward from the forward platform to the forward frame, the ladder having an upper end intersecting the forward platform intermediate the first end and the second end, the ladder having a lower end supported by the forward frame, the ladder being inclined from the lower end to the upper end, the ladder including a spaced pair of elongated stringers extending in parallel relationship from the forward frame to an upper intersection with the forward platform, the pair of stringers at the forward frame terminating at a lower intersection, the lower intersection being spaced from an imaginary vertical plane defined by the upper intersection.

2. A fluid storage tank trailer as set forth in claim 1 and further comprising:
    the ladder including a spaced set of steps, the set of steps being spaced in the vertical direction between the lower intersection and upper intersection, the steps being spaced in the horizontal direction between the lower intersection and the vertical plane.

3. A fluid storage tank trailer as set forth in claim 1 and further comprising:
    a handrail disposed generally above the walkway in spaced relation to the front wall.

4. A fluid storage tank trailer as set forth in claim 3 and further comprising:
    the handrail including a major handrail section between a ladder opening and the first end, the handrail including a minor handrail section between the ladder opening and the second end;
    the ladder opening being defined between the major handrail section and the minor handrail section;
    the ladder extending downward from the forward platform at the ladder opening.

5. A fluid storage tank trailer as set forth in claim 1 and further comprising:
    the set of steps being spaced along two intersecting inclined paths between the forward platform and the forward frame, each of the inclined paths defining a different angle in relation to the horizontal direction.

6. A fluid storage tank trailer as set forth in claim 1 and further comprising:
    a manifold assembly supported above the forward frame, the manifold assembly including a section intermediate the ladder and the front wall, the manifold assembly including a set of offset manifold ports, the section having no forward facing ports intermediate the ladder and the front wall.

7. A fluid storage tank trailer, the trailer having an elongated first side, a second side spaced from the first side in parallel relation therewith, a rear end extending between the first side and the second side, and a front end spaced from the rear end in a forward direction, the trailer comprising:
    a base, the base including a set of rear wheels mounted to engage the ground for rolling movement relative thereto;
    a tank supported by the base, the tank having a first side wall extending generally along the first side, the tank having a second side wall extending generally along the second side, the tank having a rear wall extending between the first side wall and the second side wall, the tank having a front wall spaced from the rear wall, the tank having a first front corner defined by intersection of the front wall and the first side wall, the tank having a second front corner defined by intersection of the front wall and the second side wall, the tank having a tank bottom, the tank having an internal space suitable to contain fluid material;

the base including a set of skids beneath the tank, the skids being adapted to engage the ground forward of the rear wheels when the trailer is not connected to a tow vehicle, the skids being adapted to support the tank bottom in relation to the ground;

a forward frame extending from generally beneath the tank to the front end, the forward frame including a nose bar at the front end, the forward frame being adapted to be towed by a tow vehicle;

a forward platform adjacent the front wall, the forward platform being elevated above the forward frame, the forward platform having a first end adjacent the first front corner, the forward platform having a second end adjacent the second front corner, the forward platform defining a walkway, the walkway extending between the first end and the second end at a vertical position, the vertical position being elevated above the forward frame;

a first safety gate disposed above the first end at the first side;

a second safety gate disposed above the second end at the second side; and a single ladder extending downward from the forward platform to the forward frame, the ladder having an upper end intersecting the forward platform intermediate the first end and the second end, the ladder having a lower end supported by the forward frame, the ladder being inclined from the lower end to the upper end, the ladder including a spaced pair of elongated stringers extending in parallel relationship from the forward frame to an upper intersection with the forward platform, the pair of stringers at the forward frame terminating at a lower intersection, the lower intersection being spaced from an imaginary vertical plane defined by the upper intersection, the ladder including a spaced set of steps, the set of steps being spaced in the vertical direction between the lower intersection and upper intersection, the steps being spaced in the horizontal direction between the lower intersection and the vertical plane.

8. A fluid storage tank trailer as set forth in claim 7 and further comprising:

a handrail disposed generally above the walkway in spaced relation to the front wall.

9. A fluid storage tank trailer as set forth in claim 8 and further comprising:

the handrail including a major handrail section between a ladder opening and the first end, the handrail including a minor handrail section between the ladder opening and the second end;

the ladder opening being defined between the major handrail section and the minor handrail section;

the ladder extending downward from the forward platform at the ladder opening.

10. A fluid storage tank trailer as set forth in claim 7 and further comprising:

the set of steps being spaced along two intersecting inclined paths between the forward platform and the forward frame, each of the inclined paths defining a different angle in relation to the horizontal direction.

11. A fluid storage tank trailer as set forth in claim 7 and further comprising:

a manifold assembly supported above the forward frame, the manifold assembly including a section intermediate the ladder and the front wall, the manifold assembly including a set of offset manifold ports, the section having no forward facing ports intermediate the ladder and the front wall.

12. A fluid storage tank trailer, the trailer having an elongated first side, a second side spaced from the first side in parallel relation therewith, a rear end extending between the first side and the second side, and a front end spaced from the rear end in a forward direction, the trailer comprising:

a base, the base including a set of rear wheels mounted to engage the ground for rolling movement relative thereto;

a tank supported by the base, the tank having a first side wall extending generally along the first side, the tank having a second side wall extending generally along the second side, the tank having a rear wall extending between the first side wall and the second side wall, the tank having a front wall spaced from the rear wall, the tank having a first front corner defined by intersection of the front wall and the first side wall, the tank having a second front corner defined by intersection of the front wall and the second side wall, the tank having a tank bottom, the tank having an internal space suitable to contain fluid material;

the base including a set of skids beneath the tank, the skids being adapted to engage the ground forward of the rear wheels when the trailer is not connected to a tow vehicle, the skids being adapted to support the tank bottom in relation to the ground;

a forward frame extending from generally beneath the tank to the front end, the forward frame including a nose bar at the front end, the forward frame being adapted to be towed by a tow vehicle;

a forward platform adjacent the front wall, the forward platform being elevated above the forward frame, the forward platform having a first end adjacent the first front corner, the forward platform having a second end adjacent the second front corner, the forward platform defining a walkway, the walkway extending between the first end and the second end at a vertical position, the vertical position being elevated above the forward frame;

a first safety gate disposed above the first end at the first side;

a second safety gate disposed above the second end at the second side;

a single ladder extending downward from the forward platform to the forward frame, the ladder having an upper end intersecting the forward platform intermediate the first end and the second end, the ladder having a lower end supported by the forward frame, the ladder being inclined from the lower end to the upper end, the ladder including a spaced pair of elongated stringers extending in parallel relationship from the forward frame to an upper intersection with the forward platform, the pair of stringers at the forward frame terminating at a lower intersection, the lower intersection being spaced from an imaginary vertical plane defined by the upper intersection, the ladder including a spaced set of steps, the set of steps being spaced in the vertical direction between the lower intersection and upper intersection, the steps being spaced in the horizontal direction between the lower intersection and the vertical plane;

a handrail disposed generally above the walkway in spaced relation to the front wall, the handrail including a major handrail section between a ladder opening and the first end, the handrail including a minor handrail section between the ladder opening and the second end, the ladder opening being defined between the major handrail section and the minor handrail section, the ladder extending downward from the forward platform at the ladder opening.

13. A fluid storage tank trailer as set forth in claim 12 and further comprising:

the set of steps being spaced along two intersecting inclined paths between the forward platform and the forward frame, each of the inclined paths defining a different angle in relation to the horizontal direction.

14. A fluid storage tank trailer as set forth in claim 12 and further comprising:

a manifold assembly supported above the forward frame, the manifold assembly including a section intermediate the ladder and the front wall, the manifold assembly including a set of offset manifold ports, the section having no forward facing ports intermediate the ladder and the front wall.

* * * * *